United States Patent
Durfee et al.

(10) Patent No.: US 7,793,110 B2
(45) Date of Patent: *Sep. 7, 2010

(54) POSTURE-BASED DATA PROTECTION

(75) Inventors: Glenn E. Durfee, San Francisco, CA (US); Dirk Balfanz, Redwood City, CA (US); Diana K. Smetters, Belmont, CA (US); Paul J. Stewart, Campbell, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1110 days.

This patent is subject to a terminal disclaimer.

(21) Appl. No.: 11/439,817

(22) Filed: May 24, 2006

(65) Prior Publication Data

US 2007/0277240 A1 Nov. 29, 2007

(51) Int. Cl.
*G06F 12/14* (2006.01)

(52) U.S. Cl. .................. 713/187; 713/188; 713/189; 726/27; 726/28; 726/29; 726/30; 709/225; 709/229

(58) Field of Classification Search .................. None
See application file for complete search history.

(56) References Cited

U.S. PATENT DOCUMENTS

| | | | |
|---|---|---|---|
| 6,006,332 A | 12/1999 | Rabne et al. | 713/201 |
| 6,199,178 B1 * | 3/2001 | Schneider et al. | 714/21 |
| 6,697,944 B1 | 2/2004 | Jones et al. | 713/168 |
| 7,010,698 B2 * | 3/2006 | Sheymov | 713/194 |
| 2007/0234402 A1 * | 10/2007 | Khosravi et al. | 726/2 |

* cited by examiner

*Primary Examiner*—Pramila Parthasarathy
(74) *Attorney, Agent, or Firm*—Park, Vaughan & Fleming LLP (57) ABSTRACT

One embodiment of the present invention provides a system that facilitates access to encrypted data on a computing device based on a security-posture of the computing device. During operation, the system assesses the security-posture of the computing device upon which the encrypted data is stored. If the assessed security-posture meets specified criteria, the system provides the computing device with a key which enables the computing device to access the encrypted data.

18 Claims, 8 Drawing Sheets

POSTURE-BASED DATA PROTECTION

BACKGROUND

1. Field of the Invention

The present invention generally relates to the field of computer security. More specifically, the present invention relates to a method and an apparatus that restricts access to data on a computing device based on a posture assessment of the computing device.

2. Related Art

Corporations deal with an ever-increasing amount of sensitive customer data, such as health records, bank account numbers, government identifiers, and financial records. Accidental or malicious leakage of this data can expose a company to damaging publicity, consumer lawsuits, and punitive governmental action. Unfortunately, many employees, who often are not trained in information technology and security issues, often make mistakes that can lead to the leakage of private customer data. For example, in 2006, the unencrypted personal information of almost 200,000 Hewlett-Packard employees was endangered when a laptop was stolen from the financial services company Fidelity. Another troubling example can be seen by the wealth of unencrypted information that is accidentally shared via file-sharing programs by users unaware of the extent of this sharing.

To deal with this problem, a number of companies have been attempting to develop tools that transparently protect sensitive data to minimize the risk of information leakage from accidents or casual theft. For example, in the Virtual Private Networking (VPN) space, companies have been developing systems that restrict a client's ability to access a VPN based on a "posture assessment" (PA) of the client machine. (This technique is also referred to as "network admission control" (NAC), "device verification" (DV), and "trusted network connect" (TNC).)

The PA technique operates generally as follows. Before allowing a client to connect to a network (either over a VPN or via a direct connection), the state of the client is assessed to determine whether it might be a threat to the network. If so, it may be prevented from connecting to the VPN; or, it may be connected to a quarantine network which it can use to patch itself before being allowed to connect to the VPN with full access. Existing PA implementations vary in what is assessed at each endpoint—from a simple determination of whether a client is currently running firewall and up-to-date antivirus software, to detection of the client's level of service packs and software updates, to fine-grained analysis of the versions of all of the software installed on the machine.

Although existing PA and NAC techniques can protect networks from unauthorized accesses, they do nothing to protect sensitive data after it is retrieved from the network. Note that changes in the security-posture of a client can compromise sensitive data on the client. For example, if malicious code, such as a virus, is inadvertently loaded onto the client, the malicious code may be able to access the sensitive data. This problem can be alleviated by ensuring that sensitive data is never stored on the client, and must always be accessed from a secure server. However, this requires the client to be connected to the network whenever the client needs to access sensitive data, which may not be practical for laptops or other portable computing devices, or for clients with unreliable network connections.

Hence, what is needed is a method and an apparatus that protects sensitive data on a client machine.

SUMMARY

One embodiment of the present invention provides a system that facilitates access to encrypted data on a computing device based on a security-posture of the computing device. During operation, the system assesses the security-posture of the computing device upon which the encrypted data is stored. If the assessed security-posture meets specified criteria, the system provides the computing device with a key which enables the computing device to access the encrypted data.

In a variation on this embodiment, assessing the security posture of the computing device involves determining one or more of the following: whether unverified executable code has been loaded onto the computing device; whether an unverified file has been loaded onto the computing device; whether a virus scan has been recently performed on the computing device; whether a virus scanner for the computing device has been recently updated; whether recent patches have been applied to an operating system for the computing device; whether the computing device is running an up-to-date firewall; or whether the computing device is or has been connected to an insecure network.

In a variation on this embodiment, assessing the security-posture of the computing device involves using a posture-assessment server which interacts with the computing device to assess the security-posture of the computing device.

In a variation on this embodiment, providing the computing device with the key involves using a key-management server which interacts with the computing device to provide the key.

In a further variation, the system caches the key locally on the computing device so the computing device can access the encrypted data when the computing device is unable to communicate with the key-management server. After the key is cached, the system monitors activity on the computing device. If the activity causes the security-posture of the computing device to no longer meet the specified criteria, the system erases the locally cached copy of the key so that computing device cannot access the encrypted data without interacting with the key-management server again.

In another variation, the key is specific to a particular encrypted data item, so that the computing device has to interact with the key-management server again to access another encrypted data item.

In a variation on this embodiment, providing the key to the computing device involves obtaining the key from a trusted key storage device.

In a variation on this embodiment, the specified criteria is formulated as a policy which provides selective access to specific encrypted data items based on specific security-postures of the computing device.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

One embodiment of the present invention provides a new a technique, referred to as "Posture-Based Data Protection" (PBDP), which automatically encrypts sensitive data stored on computing devices, such laptops and other mobile devices. PBDP ensures that access to encrypted documents occurs only when the device is in a known good state, and terminates when safety-violating events occur (such as unauthorized software installation).

Recall from the above discussion that existing VPN and NAC techniques protect a network and network services from unauthorized accesses, thereby allowing only authorized users of verified devices into the "trust domain" of the network and network services. The idea of PBDP is to take this paradigm one step further, to extend this "trust domain" to the device itself. This means that data on the device itself is accessible only after successful posture assessment.

Figure 1:
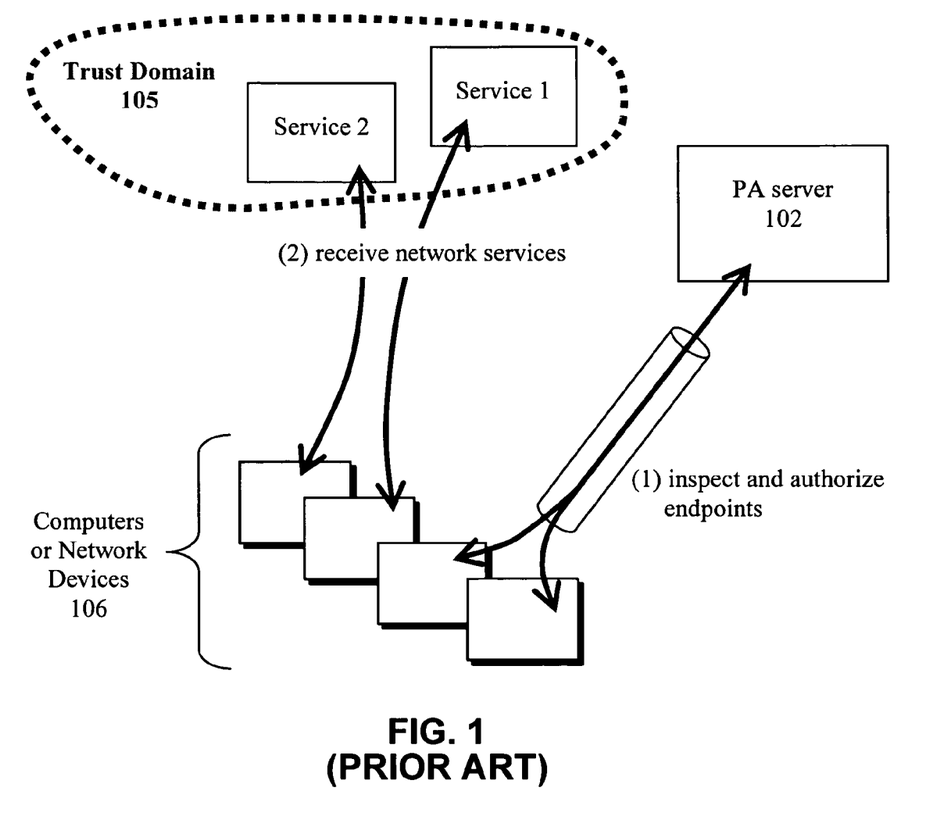
FIG. 1 illustrates a system that includes a PA server which performs posture-assessment operations on client machines.
Figure 2:
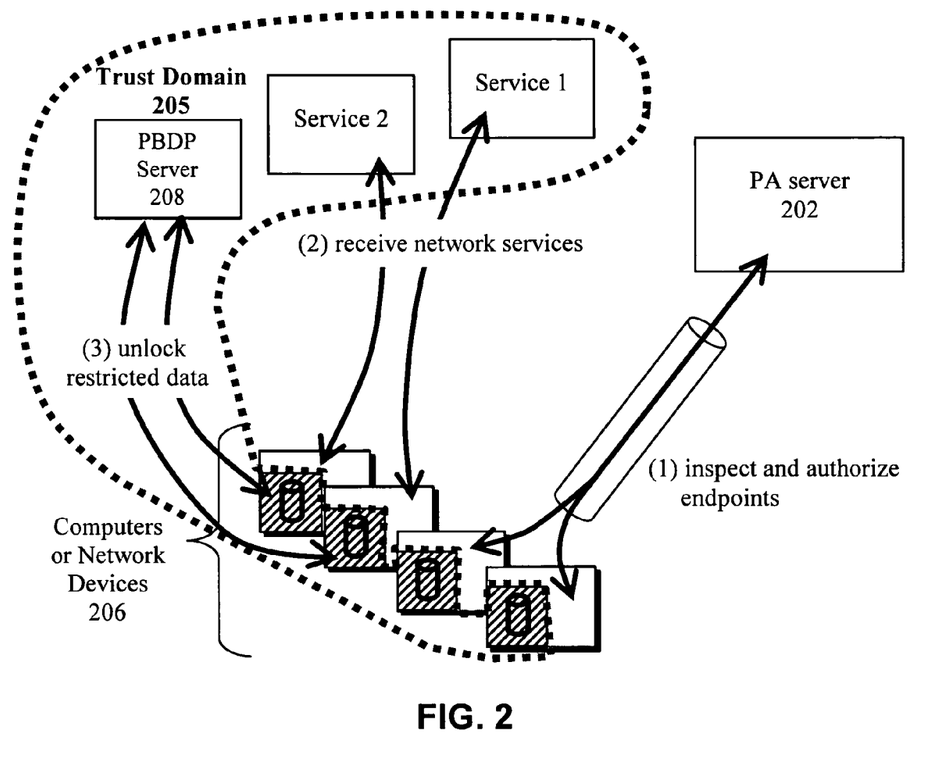
FIG. 2 illustrates a system that uses posture assessment to protect data on a client machine in accordance with an embodiment of the present invention.

A comparison of the two approaches can be seen in FIGS. 1 and 2. In the existing PA system illustrated in FIG. 1, a PA server 102 inspects and authorizes computers and network devices 106, before they are allowed to access the network and associated network services. In this system, PA server 102 ensures that only inspected and authorized computers and network devices can enter the "trust domain" 105 of the network services (inside the dashed line).

In contrast, FIG. 2 illustrates a system that also uses a PA server 202 to protect data on a client machine in accordance with an embodiment of the present invention. The system in FIG. 2 similarly uses PA server 202 to inspect and authorize computers and network devices 206 before they are allowed to access entities within trust domain 205. However, the system also provides a PBDP server 208, which selectively enables access to restricted data stored locally on computers and network devices 206. In one embodiment of the present invention, PBDP server 208 is implemented as a key-management server, which manages key that can be used to access encrypted data items located on computers and network devices 206. This process is described in more detail below with reference to FIGS. 3-8.

EXAMPLE

To illustrate how PBDP works in practice, consider the following example use case. Alice, an accountant, is issued a company laptop, which she uses throughout the work day. At the end of normal working hours, Alice notices that she is not yet finished processing data about her company's customers. She copies the data that she needs onto her laptop, which she then takes home.

At home, Alice continues processing customer data, opening Excel™ spreadsheets, copying data from Word™ documents, and so on. After a while, Alice decides she would like to connect to the Internet and install Winny, so she can download a popular movie. When she plugs in an Ethernet jack to connect to her local network (or attempts to activate her wireless card), Alice sees a dialog box appear on the laptop's screen, warning her that she has two choices: (1) connect to her home network, but lose access to the company files, or (2) log into work, and keep access to her company's files.

Suppose Alice chooses (1). Her laptop now connects to the local area network. Alice notices that the files she was working with can no longer be edited or saved, and she cannot open any other company files, either. Alice can, however, browse the Web, and possibly even download or install programs such as Winny (depending on corporate policy). Nevertheless, these newly-installed programs cannot access the company data, since the partition on which the company data is stored is now entirely unreadable. Furthermore, her laptop is now flagged as "unsafe", and when she returns to work the next day (or tries to connect to work from home), her system fails posture-assessment due to the presence of unauthorized software. The company data on the partition continues to remain unreadable until administrators remove the offending software, and the laptop passes posture-assessment again.

Suppose instead that Alice chooses (2). Immediately after connecting to her home network, her laptop establishes a VPN connection to work and proceeds through posture-assessment. Installation of Winny or other offending software is prevented by her corporate network, and through ongoing posture-assessment inspection. While her system continues to remain connected to work (or disconnected entirely from any network), Alice can continue reading, editing, and writing company files.

Variations

We now describe four variations of PBDP in accordance with different embodiments of the present invention. A first variation is a "local-cache variation" of PBDP which protects files in storage by requiring decryption keys for those files to be obtained from a server, which is only allowed after successful posture-assessment. In this variation, the keys are cached locally to improve performance. The second variation is a "server-aided variation," in which local key caching is not allowed, and decryption can be performed only with the aid of a server. The third variation is a "threshold variation," in which decryption is possible only with cooperation between a trusted key storage device (such as a smart card) and a server (or key information cached from it). Finally, the fourth variation is a "threshold server-aided variation," wherein decryption is possible only with cooperation between trusted key storage device (such as a smart card) and a server (which does not allow caching of its keying information). These variations are described in more detail below with reference to FIGS. 3-8.

System for Local-Cache Variation

Figure 3:
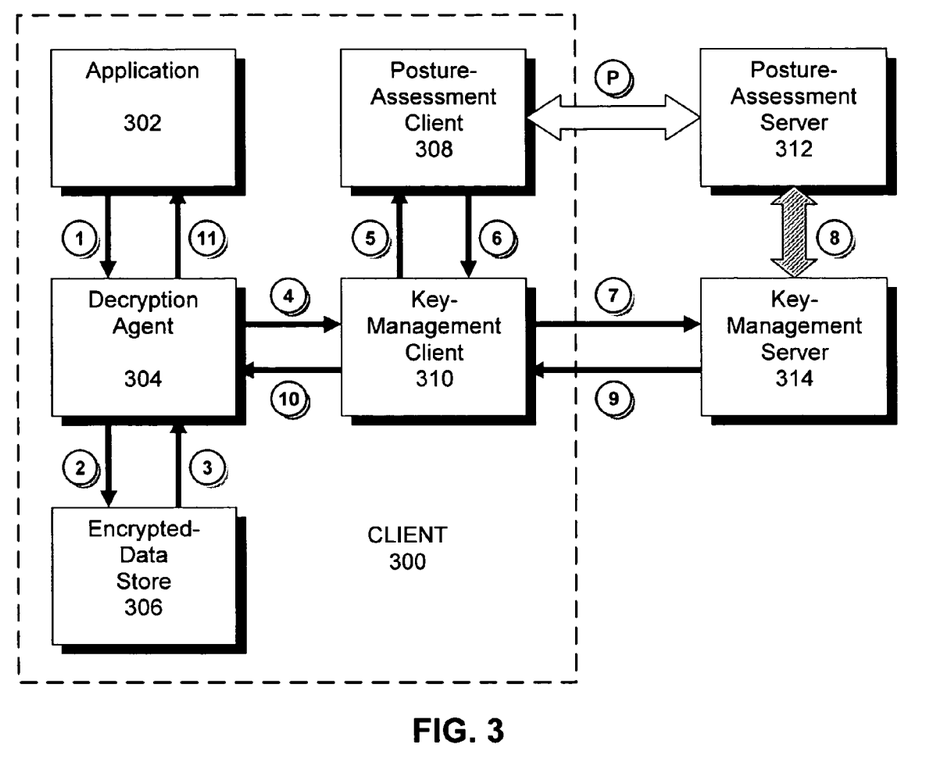
FIG. 3 illustrates an implementation of a PA system in accordance with an embodiment of the present invention.

FIG. 3 illustrates an implementation of a PA system which is associated with the local-cache variation of PBDP in accordance with an embodiment of the present invention. This implementation includes a client computer device 300. Client 300 can generally include any node on a network including computational capability and including a mechanism for communicating across the network. More specifically, client 300 can include, but is not limited to, a computer system based on a microprocessor, a mainframe computer, a digital signal processor, a portable computing device, a personal organizer, a device controller, and a computational engine within an appliance.

Client 300 contains an application 302 which accesses data within an encrypted data store 306 through a decryption agent 304. During this process, decryption agent 304 performs decryption and/or encryption operations as necessary to allow application 302 to read and/or write data from encrypted data store 306. Decryption agent 304 obtains the necessary decryption and/or encryption keys from key-management client 310 which is located within client 300. Before giving keys to decryption agent 304, key-management client 310 interacts with posture-assessment (PA) client 308, which is also located on client 300, to ensure that client 300 has the requisite security posture to obtain the keys.

Key-management client 310 in turn communicates with a key-management server 314, which is located on a remote server. Similarly, PA client 308 interacts with PA server 312, which is also located on a remote server. In one embodiment of the present invention, key-management server 314 and PA server 312 are integrated into a single remote server.

Local-Cache Variation

Figure 4:
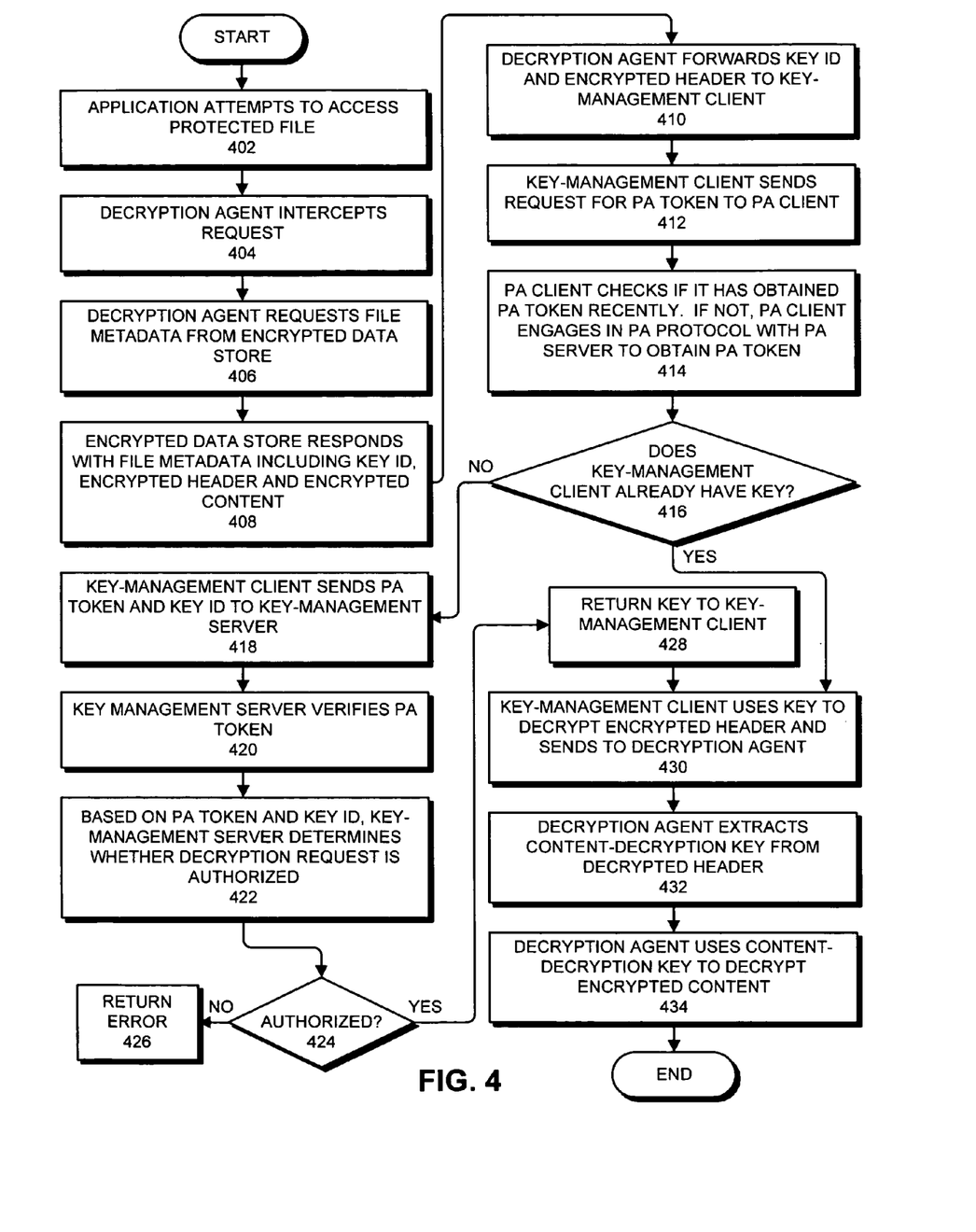
FIG. 4 presents a flow chart illustrating a first variation of the PA process in accordance with an embodiment of the present invention.

FIG. 4 presents a flow chart illustrating the local-cache variation of the PA process in accordance with an embodiment of the present invention. The process starts when application 302 attempts to open/read a file in encrypted data store 306 (step 402). This request is intercepted by decryption agent 304 (step 404).

Next, decryption agent 304 requests metadata for the file from encrypted data store 306 (step 406). Encrypted data store 306 then replies with the metadata, which includes a key identifier, an encrypted header and encrypted content (step 408)—although the encrypted content need not be exchanged until step 434.

Next, decryption agent 304 forwards the key identifier and the encrypted header to the key-management client 310 (step 410). Key-management client 310 then sends a request for a PA token to PA client 308 (step 412).

In response to this request, PA client 308 checks to see if it has obtained a PA token recently. If not, it engages in a PA protocol (P) with PA server 312 to obtain this token (step 414). (Note that the protocol (P) can take place at any point in the process before step 414.) If posture-modifying events have occurred since the last time protocol (P) was executed, the PA client 308 erases its PA token and attempts to obtain a new one via protocol (P). If the PA client 308 possesses a recently-obtained PA token, it replies to key-management client 310 with the token. Otherwise, it returns error which aborts the protocol.

At this point, key-management client 310 checks to see if it already has the key corresponding to the key identifier (called the "corresponding key") (step 416). If so, the process skips to step 430. Otherwise, key-management client 310 sends the PA token and the key identifier to the key-management server 314 (step 418).

Next, key-management server 314 engages in a protocol with PA server 312 to verify the authenticity of the PA token (step 420). This step can be omitted if the PA token is independently verifiable by key-management server 314.

Next, based on the PA token and the key identifier, key-management server 314 decides whether or not the decryption request is authorized (steps 422 and 424). If not, it returns an error to key-management client 310 (step 426). Otherwise, it returns the corresponding key for the key identifier to key-management client 310 (step 428).

At this point, the key-management client 310 possesses the corresponding key, which it uses to decrypt the encrypted header to obtain a decrypted header, which it sends to decryption agent 304 (step 430).

Next, decryption agent 304 extracts a content-decryption key from the decrypted header (step 432). Recall that decryption agent 304 already has the encrypted content associated with the request which it obtained during step 408 (or obtains it now). Hence, decryption agent 304 uses the content-decryption key to extract the decrypted content, which it sends to application 302 (step 434).

Server-Aided Variation

Figure 5:
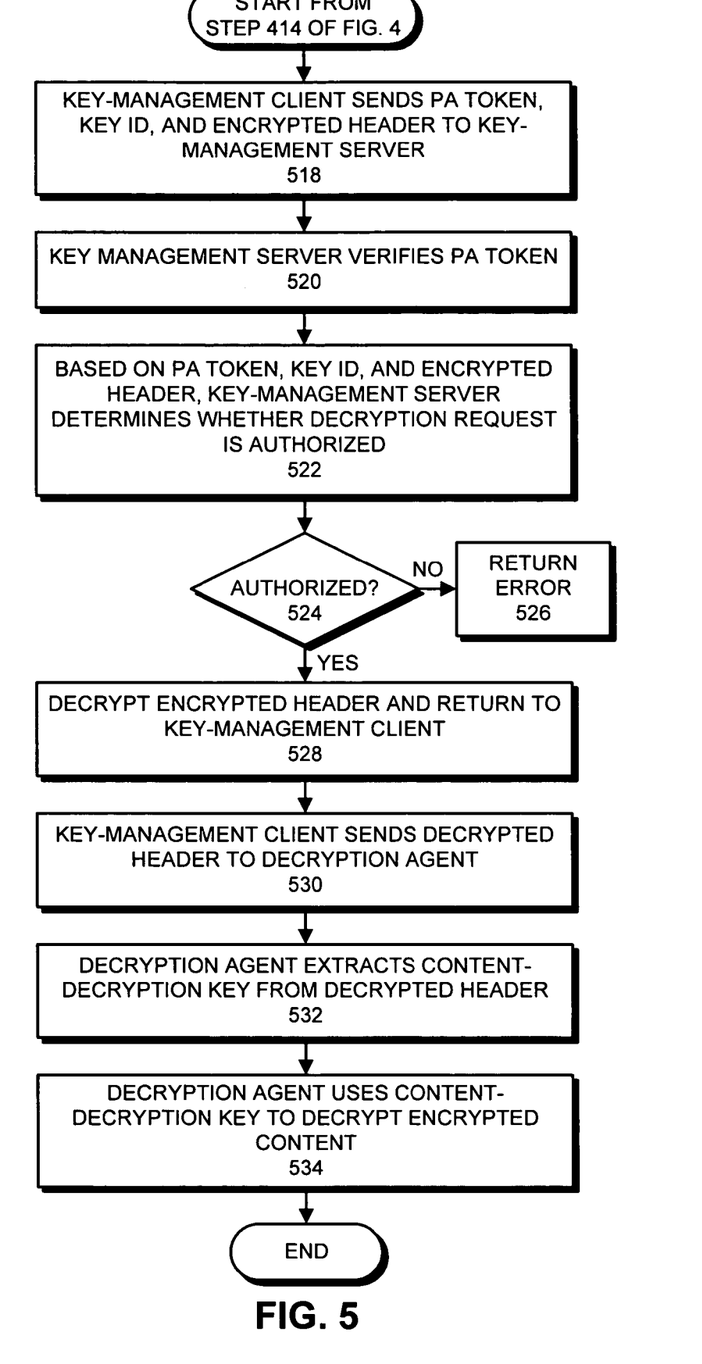
FIG. 5 presents a flow chart illustrating a second variation of the PA process in accordance with an embodiment of the present invention.

FIG. 5 presents a flow chart illustrating the server-aided variation of the PA process in accordance with an embodiment of the present invention. Note that the system illustrated in FIG. 3 also applies to this server-aided variation. The server-aided variation first repeats steps 402-414 from the flow chart illustrated in FIG. 4. Next, instead of moving to step 416, the server aided variation moves to step 518, which is described below.

At step 518, key-management client 310 sends the PA token, the key identifier and the encrypted header to the key-management server 314 (step 518).

Next, key-management server 314 engages in a protocol with PA server 312 to verify the authenticity of the PA token (step 520). This step can be omitted if the PA token is independently verifiable by key-management server 314.

Next, based on the PA token, the key identifier and the encrypted header, the key-management server 314 decides whether or not the decryption request is authorized (steps 522 and 524). If not, it returns an error to key-management client 310 (step 526). Otherwise, it uses the corresponding key to decrypt the encrypted header and returns the encrypted header to key-management client 310 (step 528).

At this point, key-management client 310 sends the decrypted header to decryption agent 304 (step 530).

Next, decryption agent 304 extracts a content-decryption key from the decrypted header (step 532). Recall that decryption agent 304 already has the encrypted content associated with this request which is obtained during step 408 (or obtains it now). Hence, decryption agent 304 uses the content-decryption key to extract the decrypted content, which it sends to application 302 (step 534).

System for Threshold Variation

Figure 6:
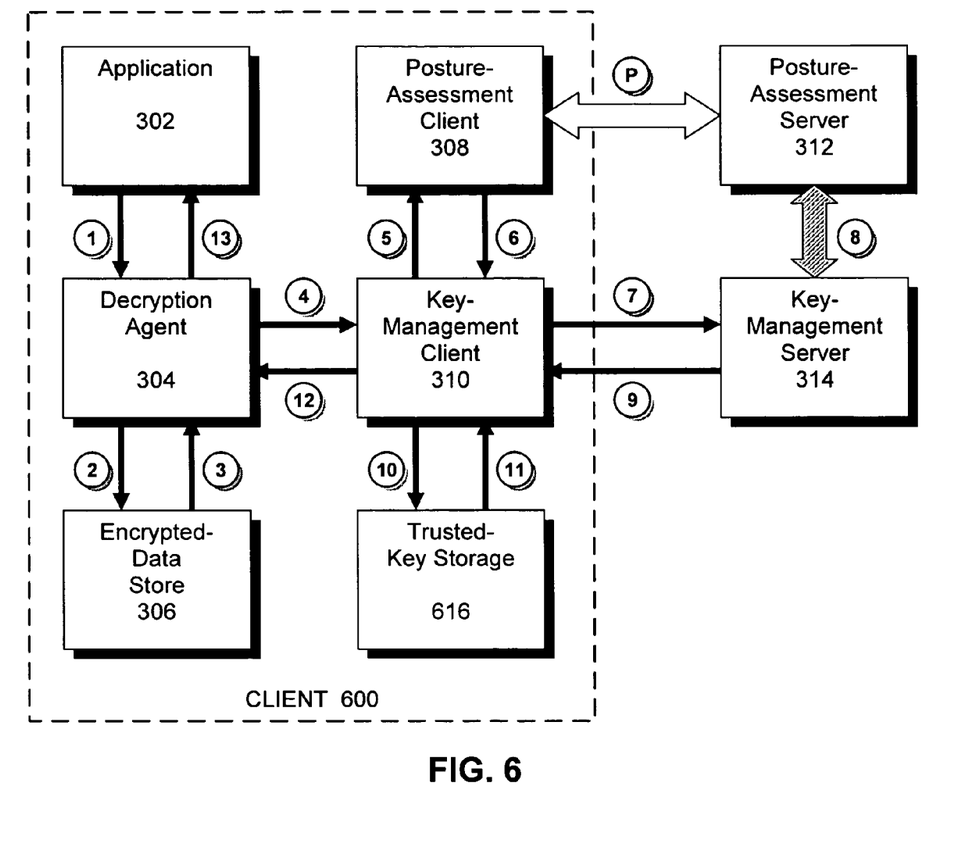
FIG. 6 illustrates another implementation of a PA system in accordance with an embodiment of the present invention.

FIG. 6 illustrates an implementation of a PA system which is associated with the threshold variation of PBDP in accordance with an embodiment of the present invention. This implementation is the same as the implementation illustrated in FIG. 3, except that a trusted key storage device 616 (such as a smart card) has been added to the system to securely store keys. Note that this trusted key storage device communicates with key-management client 310 during the decryption process.

Threshold Variation

Figure 7:
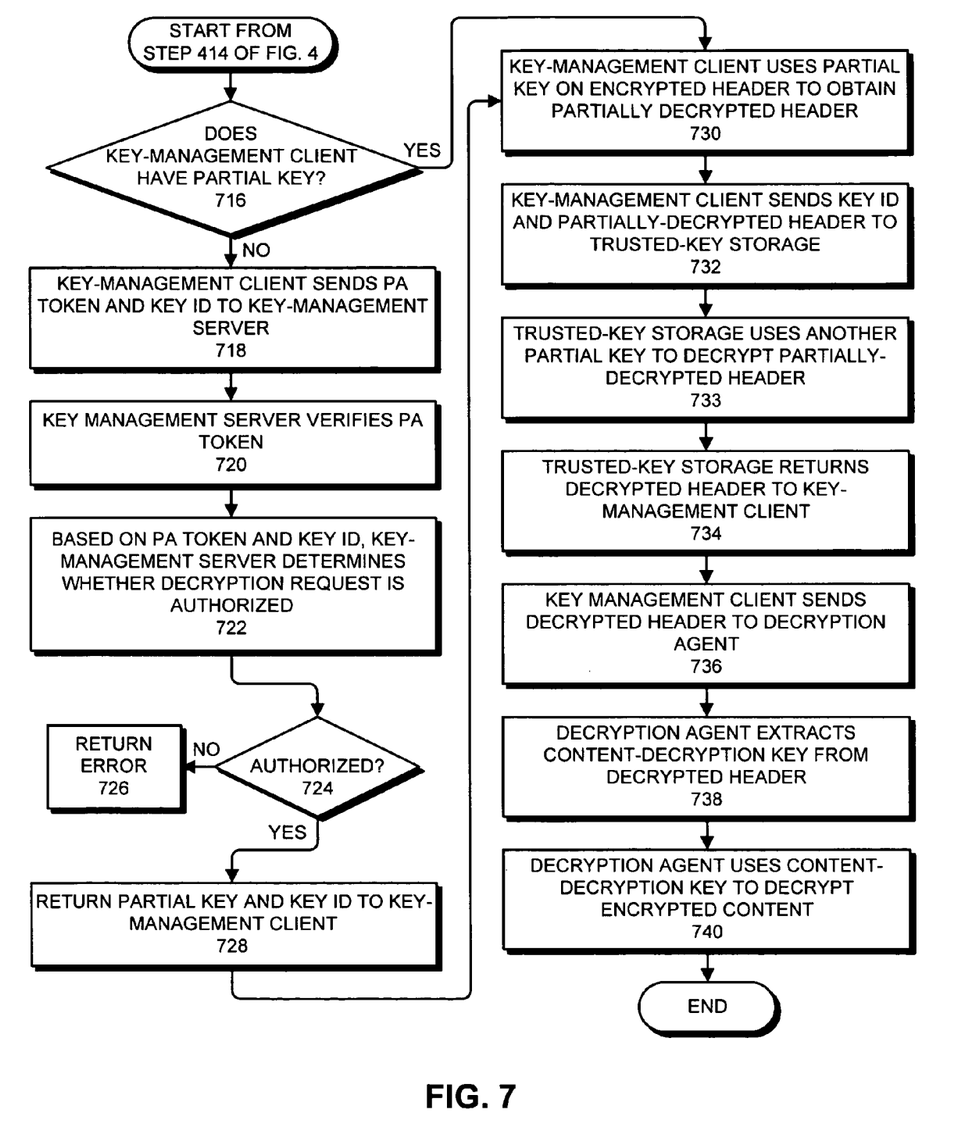
FIG. 7 presents a flow chart illustrating a third variation of the PA process in accordance with an embodiment of the present invention.

FIG. 7 presents a flow chart illustrating the threshold variation of the PA process in accordance with an embodiment of the present invention. The threshold variation first repeats steps 402-414 from the flow chart illustrated in FIG. 4. Next, instead of moving to step 416, the threshold variation moves to step 716 which is described below.

At step 716, key-management client 310 checks to see if it already has a partial key corresponding to the key identifier (step 716). If so, the process skips to step 730. Otherwise, key-management client 310 sends the PA token and key identifier to the key-management server 314 (step 718).

Next, key-management server 314 engages in a protocol with PA server 312 to verify the authenticity of the PA token (step 720). This step can be omitted if the PA token is independently verifiable by key-management server 314.

Next, based on the PA token and the key identifier, key-management server 314 decides whether or not the decryption request is authorized (steps 722 and 724). If not, it returns an error to key-management client 310 (step 726). Otherwise, it returns the partial key for the key identifier to key-management client 310 (step 728).

At this point, the key-management client 310 possesses the partial key, which it uses to decrypt the encrypted header to obtain a partially-decrypted header (step 730).

Key-management client 310 then sends the key identifier and the partially-decrypted header to trusted key storage device 616 (step 732). Trusted key storage device 616 uses another partial key (which is only stored locally within trusted key storage device 616) to decrypt the partially-decrypted header to produce a decrypted header (step 733). Trusted key storage device 616 then returns the decrypted header to key-management client (step 734).

At this point, the key-management client 310 sends the decrypted header to decryption agent 304 (step 736).

Next, decryption agent 304 extracts a content-decryption key from the decrypted header (Step 738). Recall that decryption agent 304 already has the encrypted content associated with this request which it obtains during step 408 (or obtains it now). Hence, decryption agent 304 uses the content-decryption key to extract the decrypted content, which it sends to application 302 (step 740).

Threshold Server-Aided Variation

Figure 8:
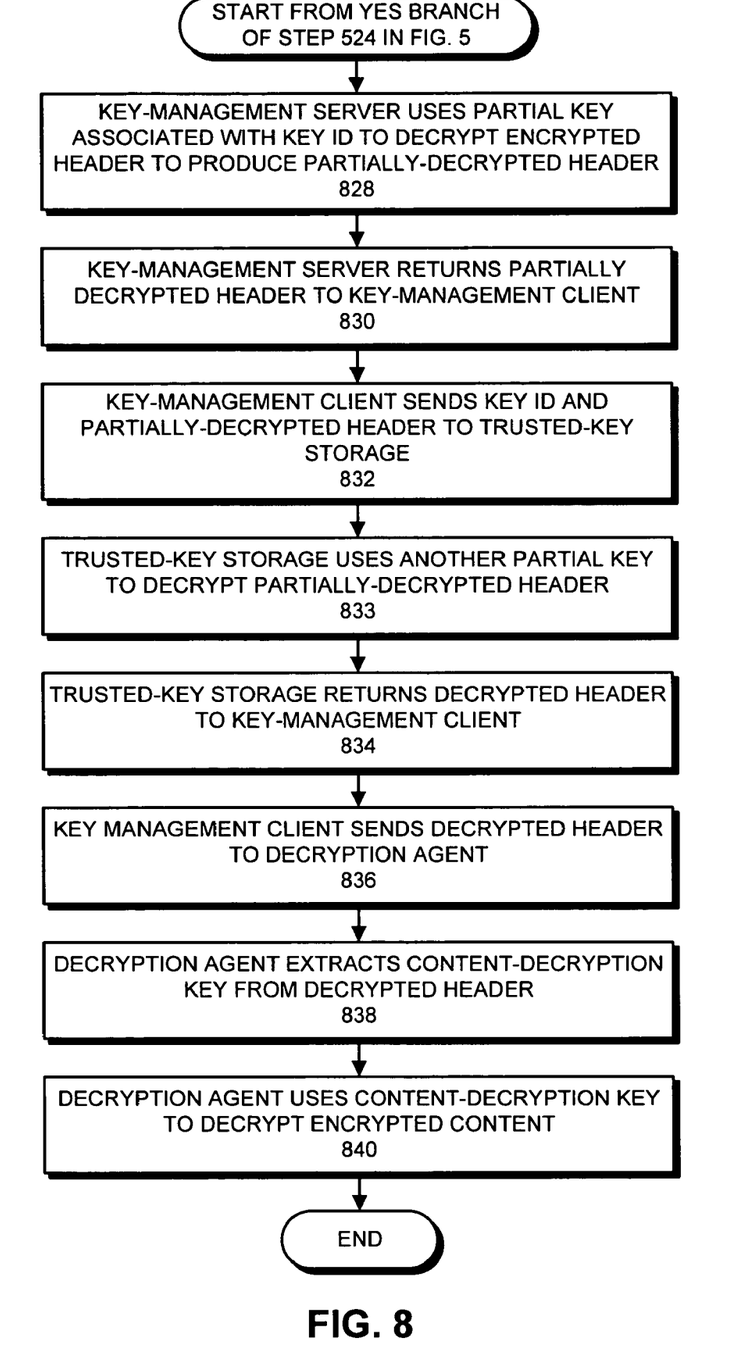
FIG. 8 presents a flow chart illustrating a fourth variation of the PA process in accordance with an embodiment of the present invention.

FIG. 8 presents a flow chart illustrating the threshold server-aided variation of the PA process in accordance with an embodiment of the present invention. Note that the system illustrated in FIG. 6 also applies to this threshold server-aided variation. The process steps for the threshold server-aided variation are the same as the for the server-aided variation illustrated in FIG. 5, except that on the "YES" branch from step 524 in FIG. 5, instead of moving to step 528, the threshold server-aided variation moves to step 828 which is described below.

At step 828, key-management server 314 uses a partial key associated with the key identifier to decrypt the encrypted header to produce a partially-decrypted header (step 828). Next, key-management server 314 returns this partially-decrypted header to key-management client 310.

Key-management client 310 then sends the key identifier and the partially-decrypted header to trusted key storage device 616 (step 832). Trusted key storage device 616 uses another partial key (which is only stored locally within trusted key storage device 616) to decrypt the partially-decrypted header to produce a decrypted header (step 833). Trusted key storage device 616 then returns the decrypted header to key-management client (step 834).

At this point, the key-management client 310 sends the decrypted header to decryption agent 304 (step 836).

Next, decryption agent 304 extracts a content-decryption key from the decrypted header (Step 838). Recall that decryption agent 304 already has the encrypted content associated with this request which it obtained during step 408 (or obtains it now). Hence, decryption agent 304 uses the content-decryption key to extract the decrypted content, which it sends to application 302 (step 840).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing access to encrypted data on a computing device based on a security-posture of the computing device, comprising:

assessing the security-posture of the computing device upon which the encrypted data is stored;

if the assessed security-posture meets specified criteria, providing the computing device with a key which enables the computing device to access the encrypted data, wherein providing the computing device with the key involves using a key-management server which interacts with the computing device to provide the key;

allowing the key to be cached locally on the computing device;

monitoring activity on the computing device; and if the activity causes the security-posture of the computing device to no longer meet the specified criteria, erasing the locally cached copy of the key so that the computing device cannot access the encrypted data without interacting with the key-management server again.

2. The method of claim 1, wherein assessing the security posture of the computing device involves determining one or more of the following:

whether unverified executable code has been loaded onto the computing device;

whether an unverified file has been loaded onto the computing device;

whether a virus scan has been recently performed on the computing device;

whether a virus scanner for the computing device has been recently updated;

whether recent patches have been applied to an operating system for the computing device;

whether the computing device is running an up-to-date firewall; and whether the computing device is or has been connected to an insecure network.

3. The method of claim 1, wherein assessing the security-posture of the computing device involves using a posture-assessment server which interacts with the computing device to assess the security-posture of the computing device.

4. The method of claim 1, wherein the key is specific to a particular encrypted data item, so that the computing device has to interact with the key-management server again to access another encrypted data item.

5. The method of claim 1, wherein providing the key to the computing device involves obtaining the key from a trusted key storage device.

6. The method of claim 1, wherein the specified criteria is formulated as a policy which provides selective access to specific encrypted data items based on specific security-postures of the computing device.

7. A computer-readable storage medium storing instructions that when executed by a computer cause the computer to perform a method for providing access to encrypted data on a computing device based on a security-posture of the computing device, the method comprising:
- assessing the security-posture of the computing device upon which the encrypted data is stored;
- if the assessed security-posture meets specified criteria, providing the computing device with a key which enables the computing device to access the encrypted data, wherein providing the computing device with the key involves using a key-management server which interacts with the computing device to provide the key;
- allowing the key to be cached locally on the computing device;
- monitoring activity on the computing device; and
- if the activity causes the security-posture of the computing device to no longer meet the specified criteria, erasing the locally cached copy of the key so that the computing device cannot access the encrypted data without interacting with the key-management server again.

8. The computer-readable storage medium of claim 7, wherein assessing the security posture of the computing device involves determining one or more of the following:
- whether unverified executable code has been loaded onto the computing device;
- whether an unverified file has been loaded onto the computing device;
- whether a virus scan has been recently performed on the computing device;
- whether a virus scanner for the computing device has been recently updated;
- whether recent patches have been applied to an operating system for the computing device;
- whether the computing device is running an up-to-date firewall; and
- whether the computing device is or has been connected to an insecure network.

9. The computer-readable storage medium of claim 7, wherein assessing the security-posture of the computing device involves using a posture-assessment server which interacts with the computing device to assess the security-posture of the computing device.

10. The computer-readable storage medium of claim 7, wherein the key is specific to a particular encrypted data item, so that the computing device has to interact with the key-management server again to access another encrypted data item.

11. The computer-readable storage medium of claim 7, wherein providing the key to the computing device involves obtaining the key from a trusted key storage device.

12. The computer-readable storage medium of claim 7, wherein the specified criteria is formulated as a policy which provides selective access to specific encrypted data items based on specific security-postures of the computing device.

13. An apparatus that provides access to encrypted data on a computing device based on a security-posture of the computing device, comprising:
- an assessment mechanism configured to assess the security-posture of the computing device upon which the encrypted data is stored;
- an access mechanism, wherein if the assessed security-posture meets specified criteria, the access mechanism is configured to provide the computing device with a key which enables the computing device to access the encrypted data, the access mechanism being further configured to use a key-management server which interacts with the computing device to provide the key;
- a caching mechanism configured to allow the key to be cached locally on the computing device; and
- a monitoring mechanism configured to monitor activity on the computing device;
- wherein if the activity causes the security-posture of the computing device to no longer meet the specified criteria, the monitoring mechanism is configured to erase the cached copy of the key so that computing device cannot access the encrypted data without interacting with the key-management server again.

14. The apparatus of claim 13, wherein while assessing the security posture of the computing device, the assessment mechanism is configured to determine one or more of the following:
- whether unverified executable code has been loaded onto the computing device;
- whether an unverified file has been loaded onto the computing device;
- whether a virus scan has been recently performed on the computing device;
- whether a virus scanner for the computing device has been recently updated;
- whether recent patches have been applied to an operating system for the computing device;
- whether the computing device is running an up-to-date firewall; and
- whether the computing device is or has been connected to an insecure network.

15. The apparatus of claim 13, wherein the assessment mechanism includes a posture-assessment server, which interacts with the computing device to assess the security-posture of the computing device.

16. The apparatus of claim 13, wherein the key is specific to a particular encrypted data item, so that the computing device has to interact with the key-management server again to access another encrypted data item.

17. The apparatus of claim 13, wherein while providing the key to the computing device, the apparatus is configured to obtain the key from a trusted key storage device.

18. The apparatus of claim 13, wherein the specified criteria is formulated as a policy which provides selective access to specific encrypted data items based on specific security-postures of the computing device.

* * * * *